United States Patent
Haire et al.

(10) Patent No.: US 10,499,627 B2
(45) Date of Patent: *Dec. 10, 2019

(54) INSECT AND TICK BARRIER AND METHOD THEREOF

(71) Applicants: Susan Haire, Rhinebeck, NY (US); Thomas Young, Albany, NY (US)

(72) Inventors: Susan Haire, Rhinebeck, NY (US); Thomas Young, Albany, NY (US)

(*) Notice: Subject to any disclaimer, the term of this patent is extended or adjusted under 35 U.S.C. 154(b) by 4 days.

This patent is subject to a terminal disclaimer.

(21) Appl. No.: 15/057,242

(22) Filed: Mar. 1, 2016

(65) Prior Publication Data

US 2016/0198693 A1 Jul. 14, 2016

Related U.S. Application Data

(63) Continuation-in-part of application No. 14/866,880, filed on Sep. 26, 2015, now abandoned.

(Continued)

(51) Int. Cl.
| | | |
|---|---|---|
| *A01M 1/14* | (2006.01) | |
| *A01M 1/10* | (2006.01) | |
| A01M 29/34 | (2011.01) | |

(52) U.S. Cl.
CPC ............ *A01M 1/14* (2013.01); *A01M 1/103* (2013.01); *A01M 29/34* (2013.01); *Y02A 50/375* (2018.01)

(58) Field of Classification Search
CPC ........ A01M 1/14; A01M 29/34; A01M 1/103; A01K 27/007

(Continued)

(56) References Cited

U.S. PATENT DOCUMENTS 3,816,956 A * 6/1974 Sekula ............... A01M 1/14
  43/114
4,091,766 A * 5/1978 Colliard ............. A01K 27/005
  119/858

(Continued)

FOREIGN PATENT DOCUMENTS

| FR | 2830726 A1 * | 4/2003 | ........... A41D 25/027 |
| GB | 2502154 A * | 11/2013 | ........... A01G 13/105 |
| WO | 1993020693 A1 | 10/1993 | |

OTHER PUBLICATIONS

Professional custom design mosquito repellent band, http://shida.gmc.globalmarket.com/products/details/professional-custom-design-mosquito-repellent-band-2008885.html, last accessed Sep. 25, 2015.

*Primary Examiner* — Magdalena Topolski
(74) *Attorney, Agent, or Firm* — Schmeiser, Olsen & Watts, LLP (57) ABSTRACT

A wearable band and an associated method that forms a barrier against ticks including a useable section of material is a flat strip of material that is torn from a rolled up section, the useable section of material including: a first side, the first side including a first fastening material, wherein the first side faces away from the user, a second side, the second side including a second fastening material that oppposingly corresponds to the first fastening material, wherein the second side fasces toward the user, and may have a track of adhesive disposed on the first side of the usable section, the track of adhesive extending completely around the limb of the user to create a barrier against a tick, such that the tick is trapped on the track of adhesive when the tick comes into direct contact with the track of adhesive.

12 Claims, 8 Drawing Sheets

Related U.S. Application Data (60) Provisional application No. 62/071,554, filed on Sep. 26, 2014.

(58) Field of Classification Search
USPC .................................................. 43/114
See application file for complete search history.

(56) References Cited

U.S. PATENT DOCUMENTS

| | | | | |
|---|---|---|---|---|
| 4,184,452 A * | 1/1980 | Buzzell | ............... | A01K 27/007 119/654 |
| 4,327,853 A * | 5/1982 | Adams | ................. | A45C 1/04 224/222 |
| 4,800,671 A * | 1/1989 | Olson | ................. | A01M 1/18 43/108 |
| 4,876,823 A * | 10/1989 | Brunetti | ............... | A01M 1/14 43/114 |
| 4,881,671 A * | 11/1989 | Horton | ................ | A01M 1/20 224/222 |
| 4,991,234 A * | 2/1991 | Greenberg | ............. | A41D 20/00 2/16 |
| 5,155,950 A | 10/1992 | Burgeson | | |
| 5,381,557 A * | 1/1995 | Luria | ................. | A01M 1/14 2/16 |
| 5,867,836 A * | 2/1999 | Quinones | ............... | A41F 9/02 2/221 |
| 6,651,379 B1 * | 11/2003 | Nelson | ................ | A01M 1/14 43/114 |
| 6,936,269 B2 * | 8/2005 | Robinson | .............. | A01M 29/12 119/856 |
| 6,998,133 B2 * | 2/2006 | Simpson | ................ | A01M 1/02 424/403 |
| 7,780,972 B2 * | 8/2010 | Hurwitz | ................ | A01N 25/34 424/411 |
| D688,944 S * | 9/2013 | Lane | .............................. | D9/435 |
| 9,339,102 B2 * | 5/2016 | Iosilevich | ............... | A45F 5/021 |
| 9,675,048 B2 * | 6/2017 | Dyer, Jr. | ............... | A01K 13/006 |
| 2002/0157273 A1 * | 10/2002 | Noyes | ....................... | A41F 9/00 33/759 |
| 2003/0186604 A1 * | 10/2003 | Nourigat | ................. | A01M 1/04 442/123 |
| 2004/0187377 A1 * | 9/2004 | Gardner, Jr. | ........ | A01M 23/005 43/114 |
| 2005/0235555 A1 * | 10/2005 | Hurwitz | ................ | A01N 25/34 43/114 |
| 2006/0188538 A1 * | 8/2006 | Emmrich | ............... | A01N 25/10 424/405 |
| 2006/0218698 A1 * | 10/2006 | Toyne | ..................... | A41D 1/06 2/231 |
| 2007/0243239 A1 * | 10/2007 | Lanser | .................... | A61L 15/46 424/448 |
| 2008/0115406 A1 * | 5/2008 | Duston | ................ | A01M 1/2011 43/131 |
| 2008/0163409 A1 * | 7/2008 | Humiston | ............... | A01M 1/14 2/410 |
| 2010/0011655 A1 * | 1/2010 | Frisch | .................... | A01M 1/14 43/114 |
| 2013/0095162 A1 | 4/2013 | Quinn | | |
| 2013/0227765 A1 * | 9/2013 | Bailey | ...................... | A41F 1/06 2/311 |
| 2013/0255134 A1 * | 10/2013 | Robinson | ................ | A01M 1/02 43/114 |

\* cited by examiner

INSECT AND TICK BARRIER AND METHOD THEREOF

CROSS REFERENCE TO RELATED APPLICATIONS

This application is a continuation-in-part which claims priority to and the benefit of U.S. application Ser. No. 14/866,880, filed Sep. 26, 2015, and entitled, "Insect and Tick Barrier and Method Thereof," which claims priority to U.S. Provisional Application No. 62/071,554, filed Sep. 26, 2014, and entitled, "Tick Repellant Band," the entire contents of which are hereby incorporated by reference.

FIELD OF TECHNOLOGY

The following relates to a wearable barrier and more specifically to embodiments of a wearable adhesive barrier that provides a barrier on a body of a person against ticks or other insects.

BACKGROUND

Enjoying the outdoors is a cherished activity for many people. When spending time outdoors, especially in wooded areas, the risk of insect or tick bites is significantly increased. Many times, people sustain bites and/or stings from insects or ticks without even noticing their presence as they crawl into position. For instance, due to the small size and weight, the insect or tick can crawl up a person's arm or leg and under their clothes without a person feeling or noticing. Unfortunately, harmful and sometimes fatal diseases can be transmitted from a tick bite. Some of the harmful diseases that can be transmitted include Lyme Disease, Anaplasmosis, Babesiosis, Powassan Virus, Rickettsios, Rocky Mountain Spotted Fever, and the like.

Thus, a need exists for an apparatus and method for a barrier that prevents an insect or a tick, from unknowingly crawling into position on a person's skin or under their clothes.

SUMMARY

A first aspect relates generally to a wearable barrier against ticks comprising an annular band, the annular band being flexible so that the annular band snugly fits around a limb of a user, the annular band including: a first layer, the first layer directly contacting at least one the user's skin, an article of clothing worn by the user, or a combination thereof, and a second layer, the second layer being an adhesive layer disposed on an outer surface of the first layer, wherein the adhesive layer extends completely around the limb of the user to extend a barrier against a tick, such that the tick is trapped on the adhesive layer when the tick comes into direct contact with the adhesive layer.

A second aspect relates generally to a wearable barrier against ticks comprising a useable section of material, the useable section of material being flexible so that the useable section of material can be manipulated to snugly fit around a limb of a user, wherein the useable section of material is a flat strip of material that is torn from a rolled up section, the useable section of material including: a first layer, the first layer directly contacting at least one the user's skin, an article of clothing worn by the user, or a combination thereof, and a second layer, the second layer being an adhesive layer disposed on an outer surface of the first layer, wherein the adhesive layer extends completely around the limb of the user to extend a barrier against a tick, such that the tick is trapped on the adhesive layer when the tick comes into direct contact with the adhesive layer.

A third aspect relates generally to a method of providing a barrier against ticks, the method comprising rolling a liner section of material into a rolled configuration, the linear section of material including: a first layer, the first layer directly contacting at least one the user's skin, an article of clothing worn by the user, or a combination thereof, and a second layer, the second layer being an adhesive layer disposed on an outer surface of the first layer, wherein the adhesive layer extends completely around a limb of the user to extend a barrier against a tick, such that the tick is trapped on the adhesive layer when the tick comes into direct contact with the adhesive layer; and wherein, when in the rolled configuration, a useable section of material is unrolled a determined length, and is physically separated from a remaining portion of the linear section material rolled into the rolled configuration, wherein the physically separated usable section of material is wrapped around the limb of the user such that an end of the usable section overlaps an opposing end and adheres to the adhesive layer of the usable section to form a snug fit around the limb of the user.

A fourth aspect relates generally to a wearable band that forms a barrier against ticks comprising: a useable section of material, the useable section of material being flexible so that the useable section of material can be manipulated to snugly fit around a limb of a user, wherein the useable section of material is a flat strip of material that is torn from a rolled up section, the useable section of material including: a first side, the first side including a first fastening material, wherein the first side faces away from the user, a second side, the second side including a second fastening material that opposingly corresponds to the first fastening material, wherein the second side faces toward the user, and a track of adhesive disposed on the first side of the usable section, the track of adhesive extending completely around the limb of the user to create a barrier against a tick, such that the tick is trapped on the track of adhesive when the tick comes into direct contact with the track of adhesive.

A fifth aspect relates generally to a roll comprising a linear section of a useable section.

A sixth aspect relates generally to a method of providing a barrier against ticks, the method comprising: rolling a liner section of material into a rolled configuration, the linear section of material including: a first side, the first side including a first fastening material, wherein the first side faces away from the user, and a second side, the second side including a second fastening material that opposingly corresponds to the first fastening material, wherein the second side faces toward the user, a track of adhesive disposed on the first side of the usable section, the track of adhesive extending completely around the limb of the user to create a barrier against a tick, such that the tick is trapped on the track of adhesive when the tick comes into direct contact with the track of adhesive, and wherein, when in the rolled configuration, a useable section of material is unrolled a determined length, and is physically separated from a remaining portion of the linear section material rolled into the rolled configuration, wherein the physically separated usable section of material is wrapped around the limb of the user such that an end of the usable section overlaps an opposing end to form a snug fit around the limb of the user The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein.

DETAILED DESCRIPTION

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Figure 1:
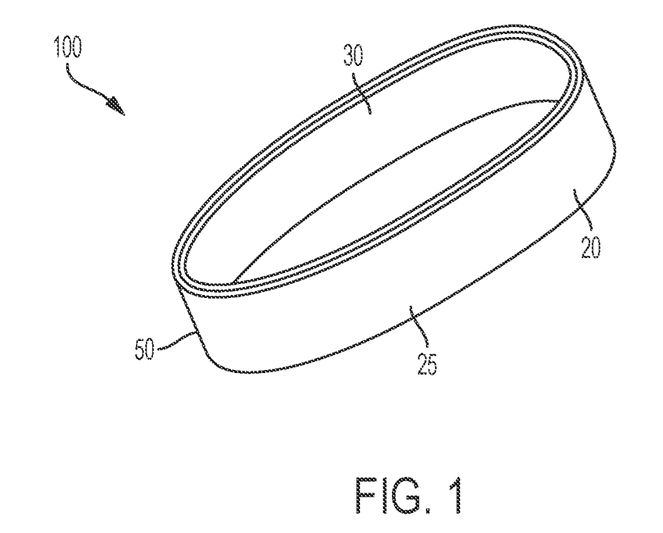
FIG. 1 depicts a perspective view of a first embodiment of a wearable barrier.
Figure 2:
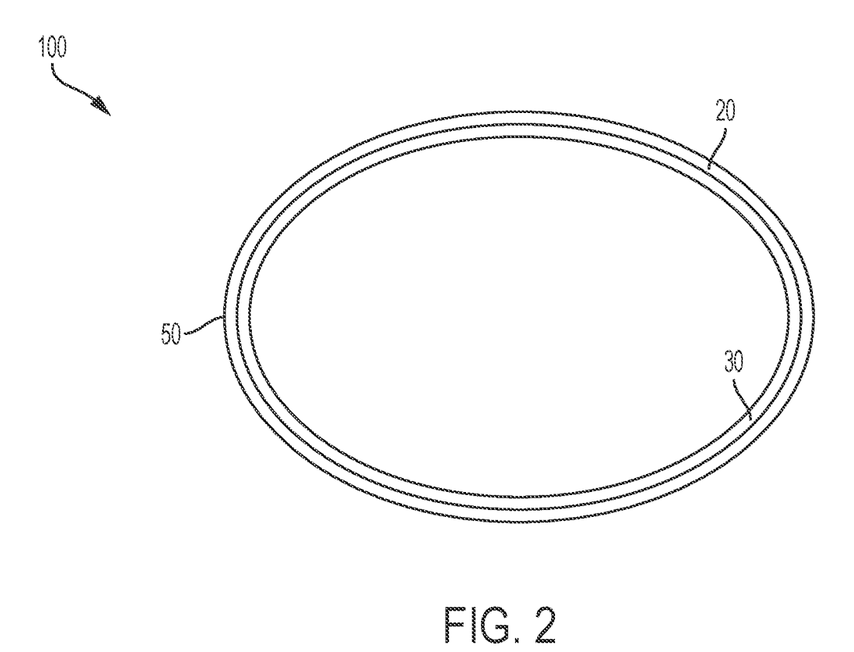
FIG. 2 depicts a top view of the first embodiment of the wearable barrier.

Referring to the drawings, FIGS. 1 and 2 depict an embodiment of a barrier 100. Embodiments of barrier 100 may be an insect barrier, a band, an insect band, a tick barrier, a tick band, a wearable band, a wearable barrier, a trap, a wearable trap, and the like. Embodiments of the barrier 100 may be elastic or otherwise flexible. For example, the barrier 100 may expand and contract to form fit against a user's skin or clothing when in a wearable position. The barrier 100 may be an annular member configured to be worn by the user in various positions as described in greater detail infra. The barrier 100 may additionally be worn by animals, such as horses and dogs, wherein references made to skin may include skin or fur of the animal.

Moreover, embodiments of the barrier 100 may include a band 50. Band 50 may be an annular strip of material forming the barrier 100. Embodiments of the band 50 may include a first layer 20 and a second layer 30. Alternatively, the band 50 may be a single player comprised of flexible material, wherein an adhesive layer is disposed on the single layer making up the band 50. Embodiments of the band 50 may be a flat section of flexible material, and may be sized and dimensioned to snugly fit around a limb or torso of a user. For example, the band 50 may be expanded to fit around a leg of the user, and then when released, it may contract to fit snugly against the user's skin or article of clothing (e.g. when the band 50 is worn directly on the clothes of a user). Moreover, the first layer 20 may be an outer layer and the second layer 30 may be an inner layer of the band 50, wherein the first layer 20 and the second layer 30 directly contact each other. In some embodiments, the first layer 20 and the second layer 30 may be permanently attached to each other. In other embodiments, the first layer 20 may be detached from the second layer 30, wherein a new, first layer 20 can be applied to the second layer 30. Furthermore, the second layer 30 may be configured to engage or otherwise make contact with a user's skin and/or clothing when being worn by the user. Embodiments of the second layer 30 may be made of an elastomeric material, a flexible material, a rubber or silicone material, a paper material, or any material that can be flexible to at least some degree and be relatively comfortable to the touch and safe for a human's skin. In yet another embodiment, the band 50 may be a single layer of material, wherein an adhesive is applied to both sides of the single layer band 50, such that a user may stick the band directly to their skin or an article of clothing.

Embodiments of the first layer 20 may be an adhesive layer. In one embodiment, the first layer 20 may include an adhesive 25 disposed on an outer surface of the first layer 20. In this embodiment, the first layer 20 may be comprised of the same material as the second layer 30, and may be structurally integral with the second layer 30, or may be detachable from the second layer 30 for replacing the adhesive 25. The outer surface of the first layer 20 may be coated with a material that can facilitate the cleaning and/or permanent removal of any adhesive 25 applied to the first layer 20. In an alternative embodiment, the first layer 20 may be comprised of the adhesive 25. In other words, a layer of adhesive 25 may be applied to the outer surface of the second layer 30 to form the first layer 20. Embodiments of the barrier 100 may be sold and packaged such that the band 50 includes a cover layer to be peeled back and removed from the band when ready for use, but preserves the integrity of the adhesive until it is worn by the user.

Embodiments of the adhesive 25 used may be a pressure sensitive adhesive, for example hot melt block-copolymers pressure sensitive adhesives, such as styrene-isoprene-styrene. Other hot melt pressure sensitive adhesives may be used as the adhesive 25, such as acrylics, polyolefin, styrene butadiene block copolymers, and styrene-ethylene-butadiene-styrene. Other classes of pressure sensitive adhesives that may be used as the adhesive 25 may include water based adhesives, such as styrene butadiene, acrylic, and natural latex, solvent based adhesives, such as styrene butadiene, acrylic, nitrile rubber, silicone, and UV curable adhesives.

Figure 3:
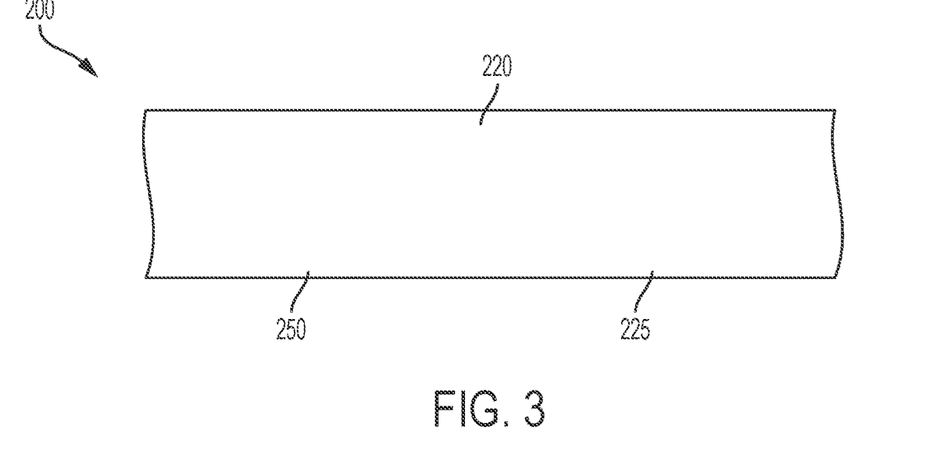
FIG. 3 depicts a top view of a second embodiment of a wearable barrier.
Figure 4:
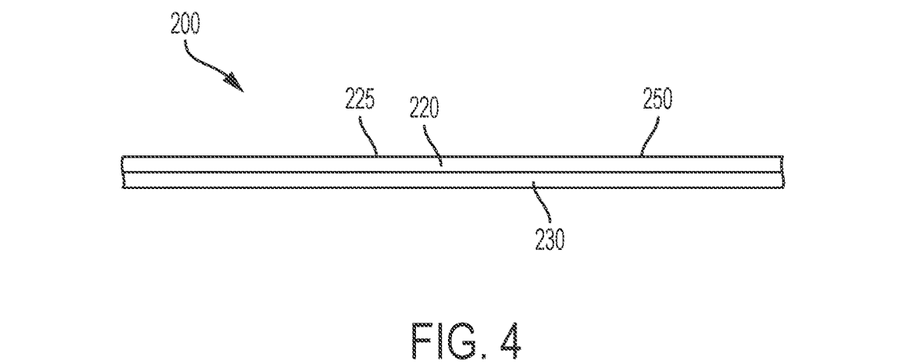
FIG. 4 depicts a side view of the second embodiment of the wearable barrier.

Referring now to FIGS. 3-4, an embodiment of barrier 200 is depicted. Embodiments of barrier 200 may be an insect barrier, a strip, a wrap, an insect band, a tick barrier, a tick band, a tick strip, a wearable strip, a wearable barrier, a trap, a wearable trap, a roll, a wrap, and the like. Embodiments of the barrier 200 may be elastic or otherwise flexible. For example, the barrier 200 may expand and contract to form fit against a user's skin or clothing when in a wearable position. The barrier 200 may be a strip or section of material configured to be worn by the user in various positions as described in greater detail infra.

Moreover, embodiments of the barrier 200 may include a usable section 250. Useable section 250 may be a section or strip of material forming the barrier 200. The usable section 250 may be a portion of a wrap or roll that is torn, cut, or otherwise structurally disengaged from the rest of the roll or wrap, as pictured in FIG. 7. The roll or wrap may be a liner length of barrier 200 that is rolled for storage and/or packaging, and can be unrolled sections at a time for use. Embodiments of the section 250 may include a first layer 220 and a second layer 230. The first layer 220 may be an outer layer and the second layer 230 may be an inner layer, wherein the first layer 220 and the second layer 230 directly contact each other. In some embodiments, the first layer 220 and the second layer 230 may be permanently attached to each other. In other embodiments, the first layer 220 may be detached from the second layer 230, wherein a new, first layer 220 can be applied to the second layer 230. Furthermore, the second layer 230 may be configured to engage or otherwise make contact with a user's skin and/or clothing when being worn by the user. Embodiments of the second layer 230 may be made of an elastomeric material, a flexible material, a rubber or silicone material, a paper material, or any material that can be flexible to at least some degree and be relatively comfortable to the touch and safe for a human's skin.

Embodiments of the first layer 220 may be an adhesive layer. In one embodiment, the first layer 220 may include an adhesive 225 disposed on an outer surface of the first layer 220. In this embodiment, the first layer 220 may be comprised of the same material as the second layer 230, and may be structurally integral with the second layer 230, or may be detachable from the second layer 230 for replacing the adhesive 225. The outer surface of the first layer 220 may be coated with a material that can facilitate the cleaning and/or permanent removal of any adhesive 225 applied to the first layer 220. In an alternative embodiment, the first layer 220 may be comprised of the adhesive 225. In other words, a layer of adhesive 225 may be applied to the outer surface of the second layer 230 to form the first layer 20.

Embodiments of the adhesive 225 used may be hot melt block-copolymers pressure sensitive adhesives, such as styrene-isoprene-styrene. Other hot melt pressure sensitive adhesives may be used as the adhesive 225, such as acrylics, polyolefin, styrene butadiene block copolymers, and styrene-ethylene-butadiene-styrene. Other classes of pressure sensitive adhesives that may be used as the adhesive 225 may include water based adhesives, such as styrene butadiene, acrylic, and natural latex, solvent based adhesives, such as styrene butadiene, acrylic, nitrile rubber, silicone, and UV curable adhesives.

Figure 5:
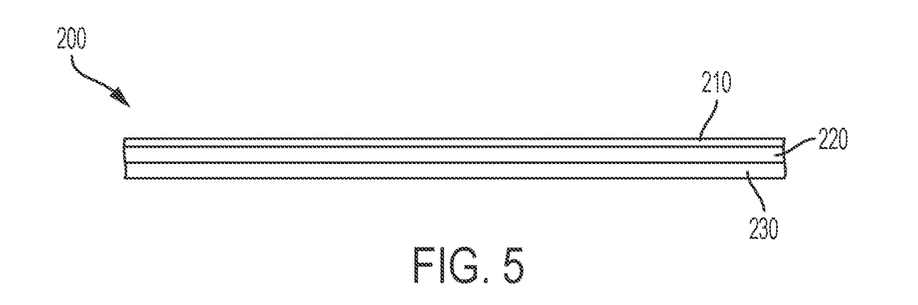
FIG. 5 depicts a side view of the second embodiment of the wearable barrier with an embodiment of a cover layer.
Figure 6:
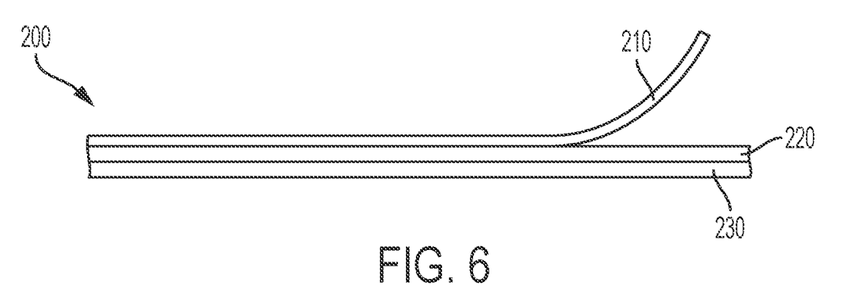
FIG. 6 depicts a side view of the second embodiment of the wearable barrier, wherein a portion of an embodiment of the cover layer is peeled back.
Figure 7:
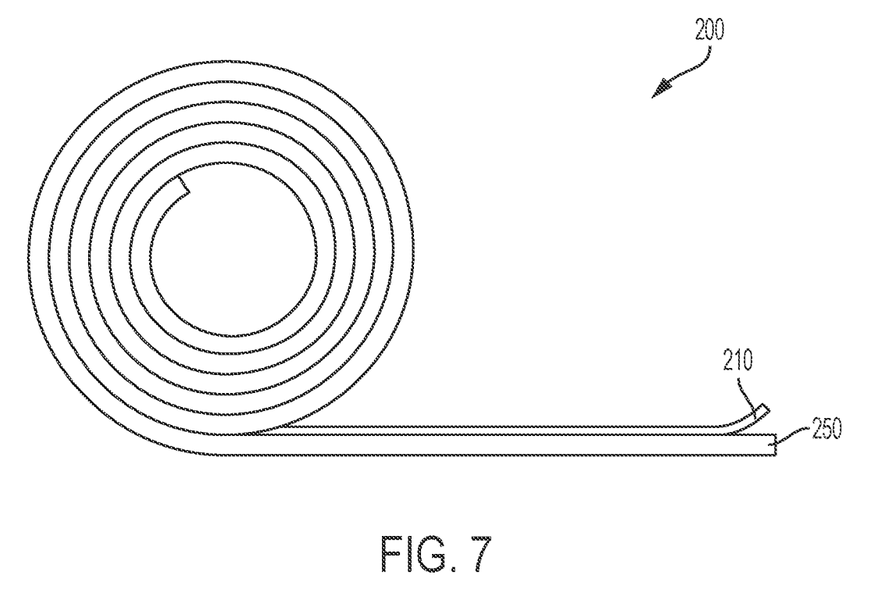
FIG. 7 depicts a side view of the second embodiment of the wearable barrier in a rolled configuration.

With additional reference to FIGS. 5 and 6, embodiments of barrier 200 may include a cover layer 210. Cover layer 210 may be a layer that may cover or otherwise be disposed on top of the adhesive layer 225. The cover layer 210 may be comprised of non-stick material, such as a non-stick material sheet that may be cut to size to match the size of the barrier 200. The cover layer 210 may removably cover the adhesive layer 225, wherein the cover layer 210 may be easily peeled back and away from the adhesive 225, as shown in FIG. 6. Further, when embodiments of barrier 200 are in a wrapped or rolled configuration, as shown in FIG. 7, the cover layer 210 may prevent contact between the adhesive surfaces.

In further embodiments, the barrier 100, 200 may include an attractant to attract an insect or a tick to the adhesive layer 25, 250. The attractant may be natural or chemical. The attractant may serve to direct or draw the tick to the adhesive layer 25, 225, as opposed to elsewhere on the user.

Figure 8:
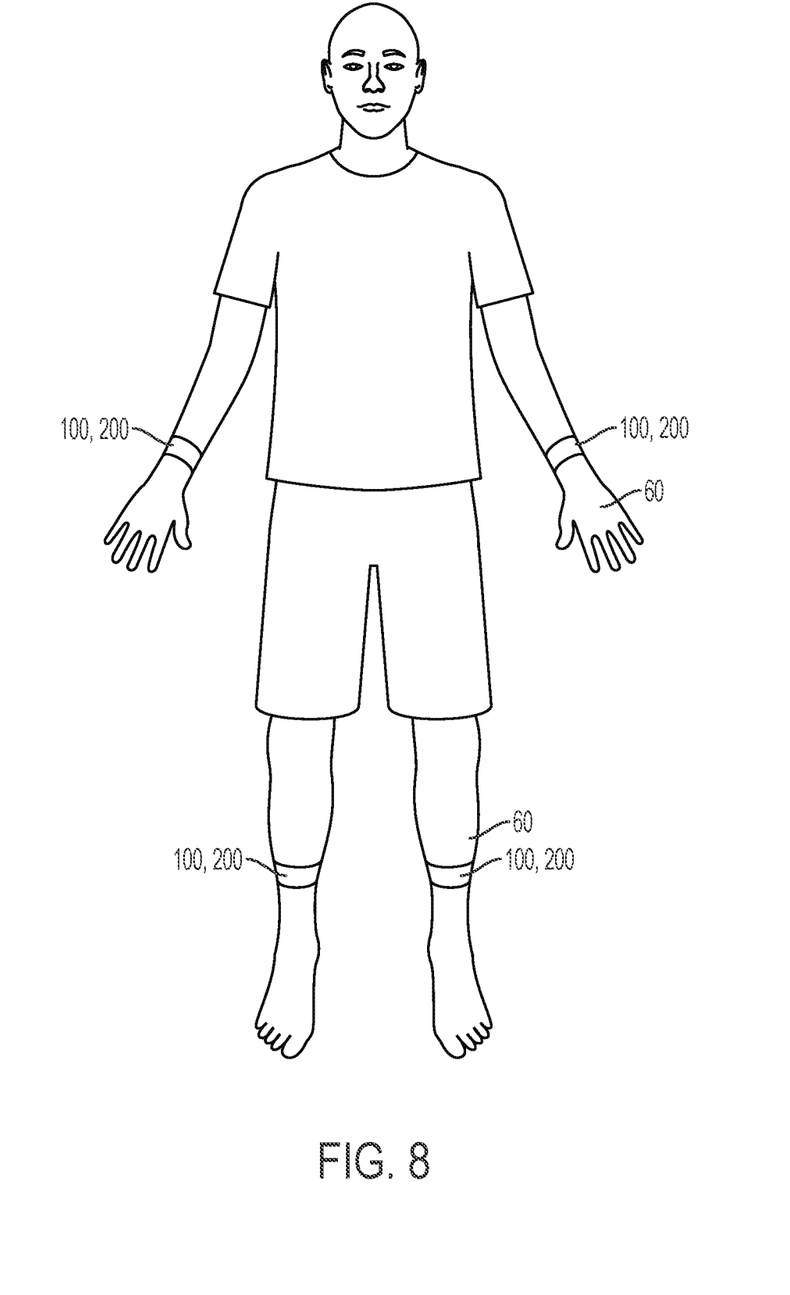
FIG. 8 depicts a view of the first and second embodiments of the wearable in a first wearable position.
Figure 9:
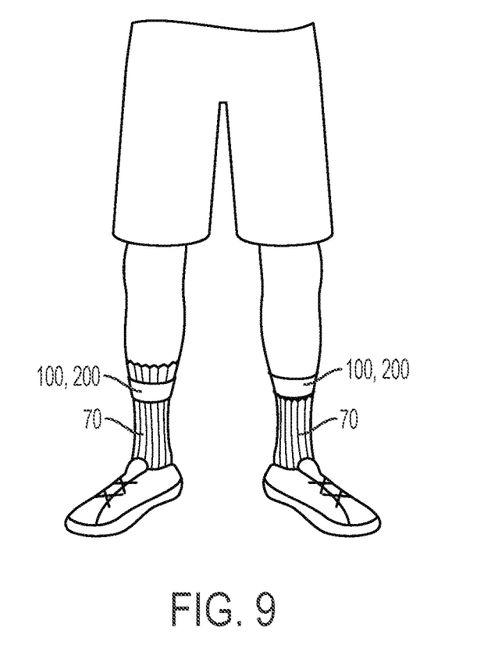
FIG. 9 depicts a view of the first and second embodiments of the wearable barrier in a second and third wearable position.
Figure 10:
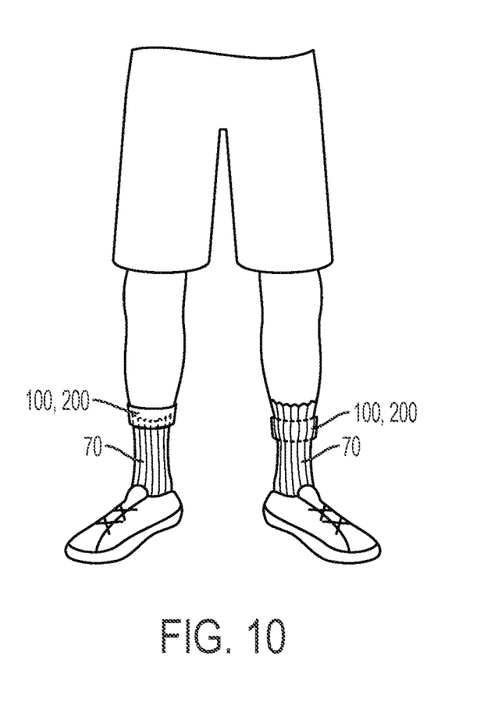
FIG. 10 depicts a view of the first and second embodiments of the wearable in a fourth and fifth wearable position.

Referring now to FIGS. 8-10, the manner in which the barrier 100, 200 may be used will now be described. As shown in FIG. 8, a user may apply the barrier 100, 200 directly to the skin of the user at various points on his or her body. FIG. 8 depicts barrier 100, 200 being worn proximate the wrists and ankles of a user, but the barrier 100, 200 may be worn around the neck, around the waist, around the leg, and various combinations thereof. When wearing/using the barrier 100, the user may simply pull the band 50 over a limb of their body and slide it into a desired location, and due to the elasticity of the band 50, the band 50 may fit snugly. When wearing/using the barrier 200, the user may determine a needed length of useable section 250, and tear or cut off the determined length from roll, and then wrap the usable section 250 around a desired limb, wherein the adhesive layer 225 may bond an end of the usable section 250 to form an annular barrier around a limb. For example, a portion of one end of the section 250 may overlap over the adhesive layer 225 proximate the other end of the section 250 when the section is wrapped around limb of the user, wherein the overlapped portion is then adhered to the adhesive layer to hold the flat section 250 into a wrapped position. Additionally, as shown in FIG. 9, embodiments of barrier 100, 200 may be worn over/on clothing, such as a sock, jacket, pants, shorts, gloves, hat, shirt, and the like. However, embodiments of barrier 100, 200 may be worn over any type of clothing worn by the user at any location of the user's body. Also shown in FIG. 9 is an embodiment where the barrier 100, 200 is worn on the user's skin but abuts the article of clothing, such as a sock. In addition, FIG. 10 depicts an embodiment where barrier 100, 200 is worn underneath an article of clothing, such as a sock. The barrier 100, 200 may be worn underneath any article of clothing worn by the user, around a limb or torso for example. Also shown in FIG. 10 is an embodiment where the barrier 100, 200 is worn partially over the user's skin and partially over the article of clothing.

Figure 11:
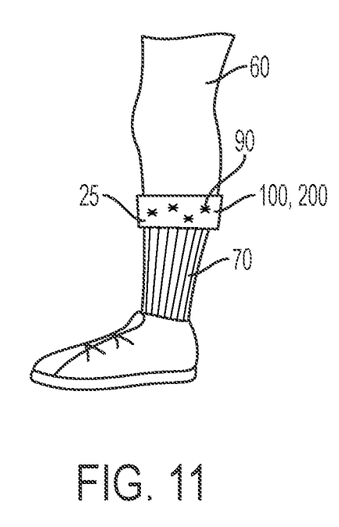
FIG. 11 depicts a view of ticks being trapped onto an adhesive layer of the first and second embodiments of the wearable barrier.

With reference now to FIG. 11, embodiments of the barrier 100, 200 may create a barrier and/or trap for one or more insects/ticks 90. Insects/ticks 90 may be any kind of tick or crawling insect or arachnid that may travel from brush, leaves, limb, plant, etc. onto a body of a person. Embodiments of barrier 100, 200 may prevent the insect/tick 90 from reaching the user's skin or continuing to travel along the user's skin toward a location covered by an article of clothing. For instance, the first layer 20, 220, which includes the adhesive 25, 225, can trap the insect or tick and prevent further movement of the insect/tick 90 based on the insect/tick 90 being in physical contact with the adhesive layer 25, 225. Thus, the insect/tick 90 is deterred from progressing, and subsequently embedding themselves upon a human host. The barriers 100, 200 may be disposed of after use, or may be reused if the first layer 20, 220 is configured to detach from the second layer 30, 230 and replaced with a new first layer 20, 220.

In an alternative embodiment, a barrier may be incorporated into an article of clothing. For example, a barrier, similar to barrier 100, may be a part of the article of clothing, wherein when the user puts on the article of clothing, the barrier may be provided. The user may be required to peel away a cover layer, as described above. As an example, a pocket may be sewn into a sock, wherein a base layer may be insertable, and an adhesive layer may be applied to the base layer which is sewn into the sock or placed within the sock. Or, a pocket may be sewn into a sock, wherein a complete barrier, such as barrier 200 may be insertable/placed within the sock or sewn into the sock. Likewise, a pocket may be sewn into a shirt or pants to accommodate a barrier. The article of clothing may be made special to include the "built-in" barrier, wherein the sock can be disposed after use. Alternatively, the sock may be reused, and the barrier replaced from within the internal pocket with a new barrier.

Referring now to FIGS. 1-11, a method of providing a barrier against ticks or other insects may include the steps of rolling a liner section 250 of material into a rolled configuration, the linear section of material 250 may include a first layer 220, the first layer 220 directly contacting at least one the user's skin, an article of clothing worn by the user, or a combination thereof, a second layer 230, the second layer 230 being an adhesive layer 225 disposed on an outer surface of the first layer 220, wherein the adhesive layer 225 extends completely around a limb of the user to extend a barrier against a tick, such that the tick is trapped on the adhesive layer 225 when the tick comes into direct contact with the adhesive layer 225, wherein, when in the rolled configuration, a useable section of material 250 is unrolled a determined length, and is physically separated from a remaining portion of the linear section material 250 rolled into the rolled configuration, and wherein the physically separated usable section of material 250 is wrapped around the limb of the user such that an end of the usable section overlaps an opposing end and adheres to the adhesive layer 225 of the usable section to form a snug fit around the limb of the user. An additional method of providing a barrier 100 for applying to a limb of a user is also contemplated.

Figure 12:
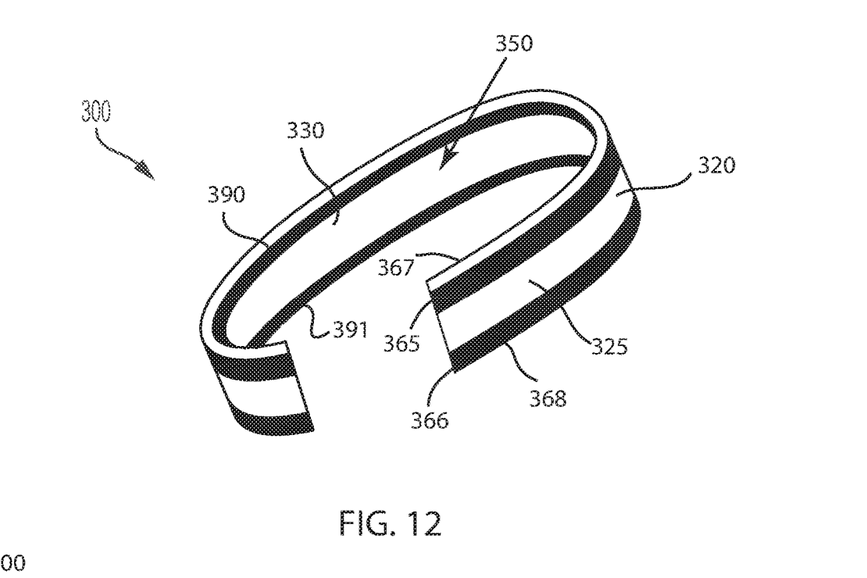
FIG. 12 depicts a perspective view of an embodiment of a wearable band.
Figure 13:
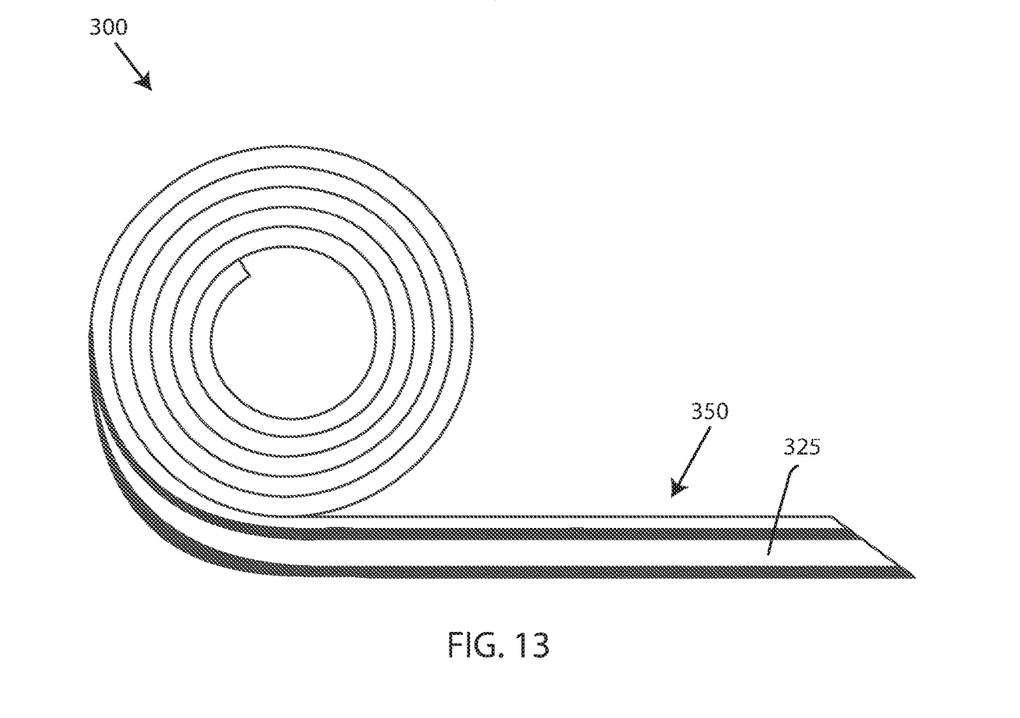
FIG. 13 depicts a side view of a roll of a wearable band.

FIGS. 12 and 13 depict embodiments of barrier 300. Embodiments of barrier 300 may be an insect barrier, a strip, a wrap, an insect band, a tick barrier, a tick band, a tick strip, a wearable strip, a wearable barrier, a trap, a wearable trap, a roll, a wrap, and the like. Embodiments of the barrier 300 may be elastic or otherwise flexible. For example, the barrier 300 may expand and contract to form fit against a user's skin or clothing when in a wearable position, or may be stretched when being manipulated. The barrier 300 may be a strip or section of material configured to be worn by the user (or animal) in various positions as described in greater detail infra.

Moreover, embodiments of the barrier 300 may include a usable section 350. Useable section 350 may be a section or strip of material arranged in a manner that forms the barrier 300. The band 350 of the barrier 300 may have a width, such as 1³/⁴", but may vary in width. The usable section 350 may be a portion of a wrap or roll that is torn, cut, or otherwise structurally disengaged from the rest of the roll or wrap, as pictured in FIG. 13. The roll or wrap may be a linear length of barrier/band material that is rolled for storage and/or packaging, and can be unrolled sections at a time for use. Embodiments of the section 350 may include a first side 320 and a second side 330. The first side 320 may be an outermost side that faces away from the skin of the wearer, while the second side 330 may be an inner layer that may face towards the skin of the wearer. In other words, the second side 330 may be configured to engage or otherwise make contact with a user's skin and/or clothing when being worn by the user.

Embodiments of the band 350 may be made of a flexible or stretchable material, or any material that can be flexible to at least some degree and be relatively comfortable to the touch and safe for a human's skin. In an exemplary embodiment, the band 350 may be comprised of a hook and loop fastener material, such as Velcro®. In this exemplary embodiment, the first side 320 of the band 350 may include the hooks, while the second side 330 include the loops, and vice versa. Further, exemplary embodiments may include a first strip 365 proximate, at, or otherwise near a top edge 367 of the band 350, and a second strip 366 proximate, at, or otherwise near a bottom edge 368 of the band 350. Each strip 365, 366 may be a section/strip of Velcro® material, such as a section/strip of hooks, or a section/strip of loops. Moreover, embodiments of the second side 330 may include opposingly corresponding fastening material (e.g. either hooks of loops, depending on the fastener material used on the first side 320), shown in FIGS. 12 and 14 as a first strip 390 and a second strip 391. The opposing fastening material on the second side 330 may cover the entire surface of the second side 330, or may be covered by strips or sections that match the positioning of the strips 365, 366 on the first side 320.

Figure 14:
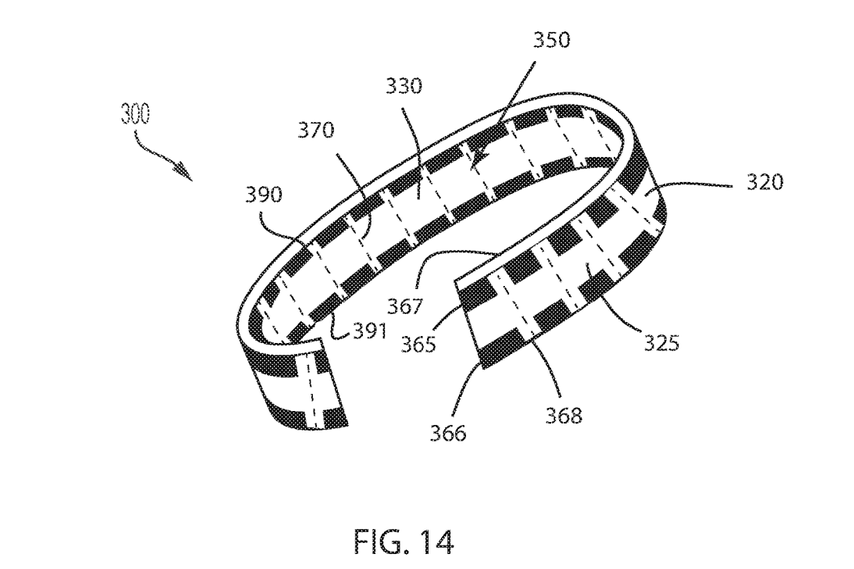
FIG. 14 depicts a perspective view of another embodiment of the wearable band.
Figure 15:
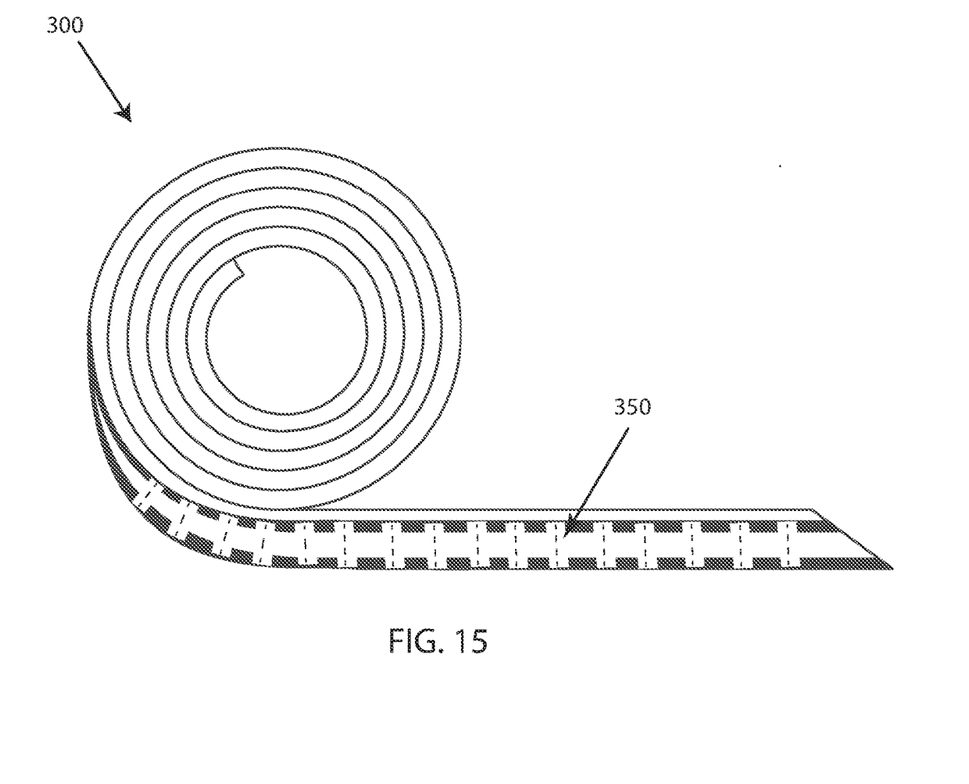
FIG. 15 depicts a side view of a roll of the wearable band.

To promote flexibility and/or ease of use tearing the band 350 from the roll, embodiments of barrier 300 may include a plurality of perforations 370, as shown in FIGS. 14 and 15. The perforations 370 may be spaced apart a distance from each other, which can allow a user to easily detach a section of the barrier 300 to be used as the band 350. In an exemplary embodiment, the plurality of perforations 370 may be spaced apart from each other by 1" to 1.5". In other words, the barrier 300 may include a plurality of perforations 370 every 1" to 1.5" along the length of the barrier 300. In addition to providing an easy and convenient way to detach a customizable length of the barrier 300, the plurality perforations 370 may also allow for additional stretching and flexing (beyond what the Velcro® material band 350 already has) that can allow a user to exact the most comfortable fit. Furthermore, the strips of fastening material 365, 366 on the first side 320 of the band 350 may be separated into a plurality of smaller sections. The space between the strips/section of material 365, 366 may vary. In an exemplary embodiment, the distance between the strips 365, 366 may be ⅛". This separation along a linear length of the barrier 300 may promote further flexibility, torsion, expansion, and the like.

Embodiments of the first side 320 of the band 350 may be an adhesive layer or track 325. The track of adhesive 325 may be positioned between the fastening material. For instance, the adhesive track 325 may be positioned between the first strip 365 of the fastening material and the second strip 366 of the fastening material. In one embodiment, an adhesive 325 may be disposed on an outer surface, wherein the track of adhesive may have varying widths. The outer surface of the band 350, (e.g. on the first side 320) may be coated with a material that can facilitate the cleaning and/or permanent removal of any adhesive 325 applied to the first side 320. Embodiments of the adhesive 325 used may be hot melt block-copolymers pressure sensitive adhesives, such as styrene-isoprene-styrene. Other hot melt pressure sensitive adhesives may be used as the adhesive 325, such as acrylics, polyolefin, styrene butadiene block copolymers, and styrene-ethylene-butadiene-styrene. Other classes of pressure sensitive adhesives that may be used as the adhesive 325 may include water based adhesives, such as styrene butadiene, acrylic, and natural latex, solvent based adhesives, such as styrene butadiene, acrylic, nitrile rubber, silicone, and UV curable adhesives.

With continued reference to FIGS. 12-15, the manner in which the barrier 300 may be used will now be described. A user may apply the barrier 300 directly to the skin of the user at various points on his or her body, similar to or the same as the positions barrier 100, 200 may be worn. When deciding to wear/use the barrier 300, the user may determine a needed length of useable section 350, and tear or cut off the determined length from roll, and then wrap the usable section/band 350 around a desired part of the body, wherein the fastening material located on the first side 320 and the second side 330 of the band 350 can mate and removably secure and/or bond with each other to form an annular barrier. For example, a portion of one end of the band 350 may overlap over the other end of the band 350, wherein the overlapped portion facilitates a physical connection between the first side 320 and the second side 330 so that the fastening material on each side fasten to each other.

In further embodiments, the barrier 300 may include an attractant to attract an insect or a tick to the adhesive layer 325. The attractant may be natural or chemical. The attractant may serve to direct or draw the tick to the adhesive layer 325 as opposed to elsewhere on the user.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

What is claimed is:

1. A wearable band that forms a barrier against ticks comprising:
    a useable section of material, the useable section of material being flexible so that the useable section of material can be manipulated to snugly fit around a limb of a user, the useable section of material including:
        a first side, the first side including a first fastening material, the first fastening material including a first strip and a second strip, wherein the first strip runs against a first edge of the first side and the second strip runs against a second edge of the first side, wherein the first side faces away from the user, and each of the first strip and the second strip extend at least one of: (i) continuously along an entire length of the wearable band, and (ii) at a plurality of discrete locations extending along the entire length of the wearable band, wherein a track of adhesive is disposed between the first strip and the second strip; and
        a second side, the second side including a second fastening material that fastens to the first fastening material, the second fastening material including a third strip and a fourth strip, wherein the third strip runs against a first edge of the second side and the fourth strip runs against a second edge of the second side, wherein the second side is configured to face toward the user, and each of the third strip and the fourth strip extend at least one of: (i) continuously along the entire length of the wearable band, and (ii) at a plurality of discrete locations extending along the entire length of the wearable band wherein the first fastening material is a plurality of hooks, and the second fastening material is a plurality of loops.

2. The wearable band of claim 1, wherein the track of adhesive is a pressure sensitive adhesive.

3. The wearable band of claim 2, wherein the pressure sensitive adhesive is a hot melt pressure sensitive adhesive.

4. The wearable band of claim 1, further comprising a plurality of perforations located on the useable section.

5. The wearable band of claim 1, wherein the first strip comprises a plurality of sections that are spaced apart a distance.

6. The wearable band of claim 1, further comprising an attractant to attract a tick to the track of adhesive.

7. The wearable band of claim 1, further comprising a cover layer placed onto the first side of the useable section.

8. The wearable band of claim 7, wherein the cover layer is a non-stick surface sheet, and is peeled back and away from the first side when being used by the user.

9. The wearable band of claim 1, wherein the track of adhesive extends completely around the limb of the user to create a barrier against a tick, such that the tick is trapped on the track of adhesive when the tick comes into direct contact with the track of adhesive.

10. A roll comprising a linear section of a useable section, the useable section of material being flexible so that the useable section of material can be manipulated to snugly fit around a limb of a user, wherein the useable section of material is a flat strip of material that is torn from a rolled up section, the useable section of material including:
    a first side, the first side including a first fastening material, wherein the first side faces away from the user, wherein the first fastening material includes a first strip and a second strip, the first strip running against a first edge of the first side and the second strip running against a second edge of the first side, and wherein each of the first strip and the second strip extend at least one of: (i) continuously along an entire length of the roll, and (ii) at a plurality of discrete locations extending along the entire length of the roll, and wherein a track of adhesive is disposed between the first strip and the second strip; and
    a second side, the second side including a second fastening material that fastens to the first fastening material, wherein the second side is configured to face toward the user, the second fastening material including a third strip and a fourth strip, the third strip running against a first edge of the second side and the fourth strip running against a second edge of the second side, and wherein each of the third strip and the fourth strip extend at least one of: (i) continuously along the entire length of the roll, and (ii) at a plurality of discrete locations extending along the entire length of the roll wherein the first fastening material is a plurality of hooks, and the second fastening material is a plurality of loops.

11. The roll of claim 10, wherein the linear section includes a plurality of perforations to facilitate tearing of a section from the linear section.

12. A wearable band that forms a barrier against ticks comprising:
    a useable section of material, the useable section of material being flexible so that the useable section of material can be manipulated to snugly fit around a limb of a user, the useable section of material including:
        a first side, the first side including a first fastening material, wherein the first side faces away from the user, the first fastening material including a first strip and a second strip, and each of the first strip and the second strip are disposed at a plurality of discrete locations along the entire length of the wearable band, wherein a track of adhesive is disposed between the first strip and the second strip; and a second side, the second side including a second fastening material that fastens to the first fastening material, wherein the second side is configured to face toward the user, the second fastening material including a third strip and a fourth strip, and each of the third strip and the fourth strip are is disposed at a plurality of discrete locations along the entire length of the wearable band;

wherein the adhesive is uncovered and exposed wherein the first fastening material is a plurality of hooks, and the second fastening material is a plurality of loops.

* * * * *